United States Patent [19]
Spanel

[11] 3,887,771
[45] June 3, 1975

[54] TELEPHONE ADAPTER

[76] Inventor: Abram N. Spanel, 344 Stockton St., Princeton, N.J. 08540

[22] Filed: Mar. 4, 1974

[21] Appl. No.: 447,690

[52] U.S. Cl. ............................... 179/1 C; 58/152 T
[51] Int. Cl. ............................................ H04m 1/21
[58] Field of Search ......... 179/1 C, 1 HF; 85/152 T; 181/177, 184, 25

[56] References Cited

UNITED STATES PATENTS

| | | | |
|---|---|---|---|
| 799,659 | 9/1905 | Lewis | 181/25 |
| 2,609,045 | 9/1952 | Kaiser | 58/152 T |
| 2,987,575 | 6/1961 | Chalfin | 179/1 C |
| 3,376,390 | 4/1968 | Hashimoto | 179/1 C |
| 3,512,355 | 5/1970 | Lang | 58/152 T |

*Primary Examiner*—Kathleen H. Claffy
*Assistant Examiner*—Tommy P. Chin
*Attorney, Agent, or Firm*—Steele & Petock

[57] ABSTRACT

A telephone adapter provides high acoustic amplification for sound to be transmitted over a telephone. A horn of the "exponential" type having an odd number of sound passages including an even number of re-entrant passages, a relatively large area mouth and gradual taper is used to acoustically amplify the transmitted sound with minimum added distortion and with minimum added background noise and to effectively transfer the amplified sound to a telephone handset at a position removed from the horn mouth. Walls within the horn form sound passages of gradually decreasing cross-section which extend from the mouth to the tail of the horn, where an easy connect/disconnect acoustic coupling with the microphone of the telephone handset is provided. The tail of the horn is provided with an acoustical coupler which is shaped to transfer the amplified sound to the microphone of the telephone handset with minimum loss. This acoustic coupling is established when the telephone handset is in place on the telephone adapter. A conventional earphone transducer, an audio amplifier, and a loudspeaker in its separate housing are used to make audible the sound received via the telephone earphone.

15 Claims, 3 Drawing Figures

TELEPHONE ADAPTER

BACKGROUND OF THE INVENTION

This invention relates to amplifying systems for telephones and more particularly to an acoustic amplifier for conveniently and efficiently amplifying and coupling normal room conversation into the microphone of a telephone handset.

Prior art acoustic amplifiers for telephones either are inconvenient to use or suffer from low amplification, added sound distortion, and limited rejection of background noise. These contribute to the frequently observed effect that the speaker seems to be "talking in a well". Prior art telephone acoustic amplifiers which are convenient to use with a conventional telephone handset have insufficient amplification, insufficient noise rejection, etc., to allow a person at some distance from the telephone to effectively converse in a normal voice. Conversely, prior art telephone acoustic amplifiers which have higher amplification and noise rejection require specialized equipment which cannot be conveniently used with a conventional telephone handset.

The Beatty U.S. Pat. No. 3,170,990 describes a telephone set in which high amplification of transmitted sound is possible. However, electrical, rather than acoustical, amplification is used and no means exists for reduction of associated background noise.

The Massa U.S. Pat. No. 2,381,174 and the Koch U.S. Pat. No. 2,580,439 describe use of horns with which high amplification of sound is possible. However, these horns are permanently connected to associated transducers and no means is described for their use with a conventional telephone handset.

The Souget et al., U.S. Pat. No. 2,632,811 employs a horn but uses an electronic, not an acoustic, amplifier for amplifying the transmitted sound. French Patent 934,311 shows a single exponential sound passage; there are no re-entrant sound passages.

The Chalfin U.S. Pat. NO. 2,987,575 describes an acoustic amplifier using an exponential type horn which is coupled to a telephone handset. The horn, however, has an odd number of re-entrant passages which results in the mouth and the tail being at the same end of the horn, i.e., as stated by Chalfin "mouth and a throat in substantially the same plane". This horn has limited amplification, particularly for voices some distance away since the effective entrance area of its mouth is only about 10 square inches, its mouth being obscured by the telephone handset. Also, it has limited background rejection since the maximum diameter of its mouth is only about 4 inches. (These dimensions are relative to the dimensions of a conventional telephone handset shown in the drawings.)

Moreover, the Chalfin U.S. Pat. No. 2,987,575 describes a speaker for reproducing the received sound which is mounted within the same enclosure as the horn. This prevents acquisition of low level sounds by the horn which otherwise would be possible, since the close proximity of the horn and the speaker, as well as the sonic conduction through the common housing results in acoustical coupling between the two which causes regenerative howl when used with horns having the high acoustical amplification desired. (The sound transferred by the horn into a conventional handset microphone is reproduced by the handset earphone, and in turn is electronically amplified and made audible by the loudspeaker, thus forming the regenerative acoustical "loop" which results in regenerative howl above a given loop amplification.) In the patent described herein, this acoustical coupling is greatly reduced by placing the speaker in a separate housing and orienting the speaker so it is not directed at the horn.

An "exponential" type horn provides high effective acoustical amplification by intercepting with the mouth of the horn sound energy from an area of the acoustic wave front. Much larger than the area intercepted by the unaided telephone microphone and gradually channeling this large-area, low-amplitude sound into a smaller area, higher amplitude sound which is then coupled to the telephone microphone. The increase in acoustic energy, and hence amplification imparted by the exponential horn is directly related to the ratio of the effetive entrance areas of the horn and the telephone microphone. Also, the directivity of the horn, and hence its ability to reject background noise in any plane is directly related to its maximum diameter in that plane.

SUMMARY OF THE INVENTION

In accordance with this invention a re-entrant "exponential" type horn provides high acoustic amplification of the transmitted telephone conversation in a telephone adapter having a housing which is of a convenient size for desk top use. The re-entrant structure of the horn allows the housing to be compact in size while providing an overall sound passage of relatively long acoustic length which tapers gradually from a wide mouth to a smaller tail which is coupled to the telephone handset microphone. The gradual tapering of the walls provides less added acoustical distortion than previously encountered in this type of device.

In accordance with this invention an "exponential" type horn having an effective mouth area relatively large compared with that of a telephone handset microphone provides high amplification of sound to be transmitted over a telephone and also provides moderate directivity for reduction of background noise. This directivity is such as to increase acquisition of sounds in an angular area about the horn axis while decreasing acquisition of sounds outside of this area. This permits a person at some distance from the telephone to converse in a substantially normal voice.

In accordance with this invention, an "exponential" type horn having an odd number of sound passages with an even number of re-entrant passages provides high acoustic amplification of the transmitted telephone conversation in a telephone adapter and provides easy connect/disconnect acoustic coupling with the microphone of the telephone handset at a position where the horn mouth is not obscured by the handset.

In accordance with another feature of the invention, a surface of the housing is designed to serve as a resting place for the telephone handset and with the handset resting in position, good acoustic coupling is provided between the tail of the horn and the telephone handset microphone.

In accordance with another feature of the invention, the opening of the mouth is substantially coextensive with an open side of the housing in which the horn is mounted. This provides a maximum mouth area for a given size housing.

In accordance with another aspect of the invention, a telephone call timer is embodied in the telephone adapter. The timer prominently displays the elapsed time of a telephone call. An important feature of this timer is that it generates noise of a level sufficiently low to not be annoyingly transmitted by the telephone nor to annoy the user of the telephone adapter.

In accordance with still another aspect of the invention, provision is made for recording the telephone conversation being transmitted/received via the telephone adapter by plugging a conventional tape recorder jackplug into a recorder jack provided. Use of the jack can introduce a periodic audio "beep" into the telephone conversation, giving indication that it is being recorded.

The foregoing and other objects, features and advantages of the invention will be better understood from the following more detailed description and appended claims.

DESCRIPTION OF THE DRAWINGS

FIG. 3 shows the sound path through the horn to the telephone handset microphone, and the interconnection of the earphone transducer, audio amplifier, speaker, audio beeper, tape recorder/plug/jack, and associated batteries and power supply.

DESCRIPTION OF THE PREFERRED EMBODIMENT

Figure 1:
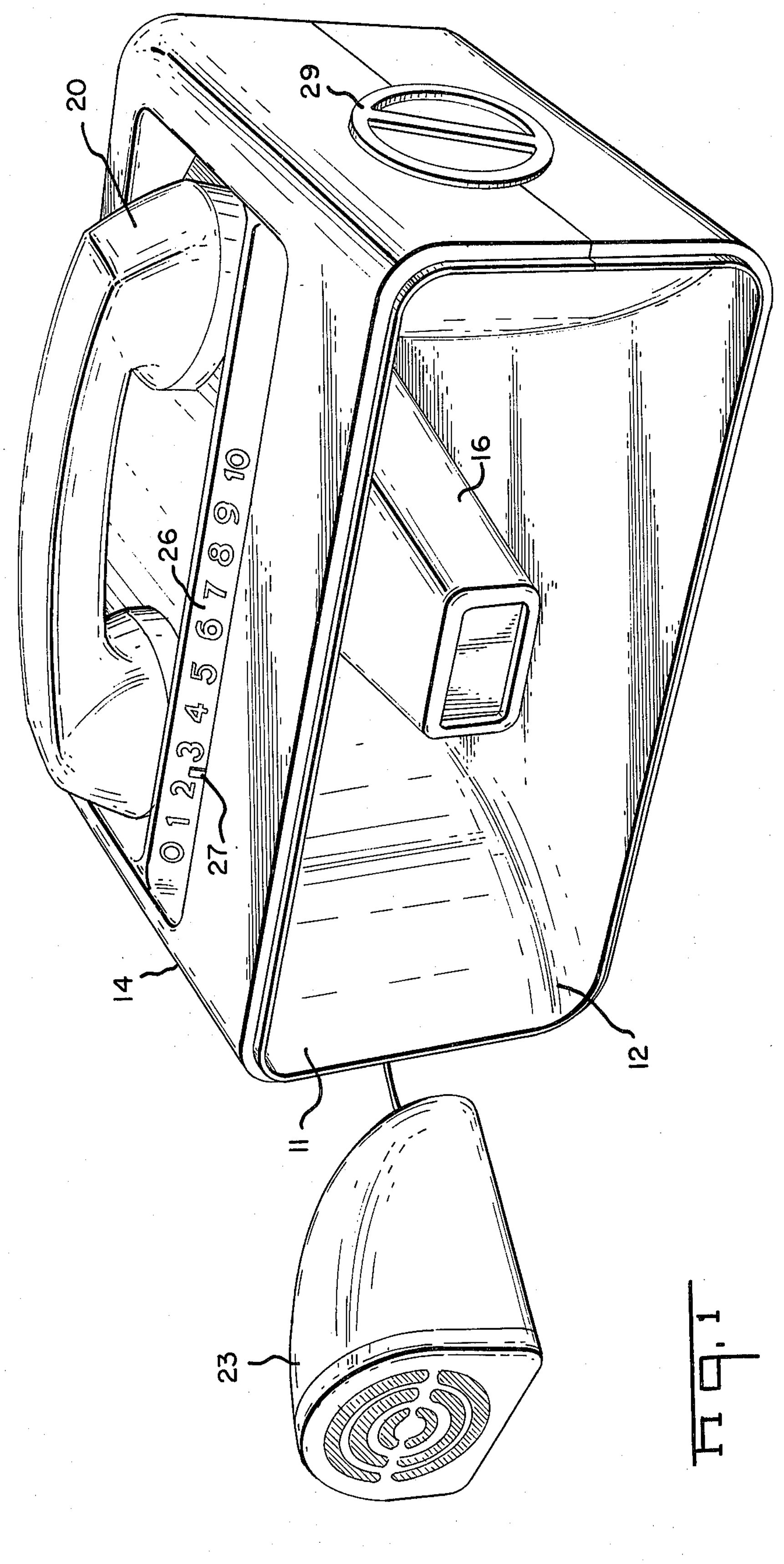
FIG. 1 is a front view of the preferred embodiment of the telephone adapter of this invention, with the telephone handset in place on the adapter.

An "exponential" type horn 11 has an open mouth 12. The horn contains an odd number of sections, an even number of which are re-entrant sections, which in combination form a continuous sound passage of gradually decreasing cross-section extending from the open mouth 12 to the tail portion 13. The tail portion 13 terminates in coupling chamber 15 which extends through an opening in housing 14 and has a shape mated to that of the microphone 20M of the telephone handset 20 to provide easy acoustic coupling and decoupling with the handset microphone 20M.

The horn 11 has a mouth 12 with an effective area which is relatively large compared to that of the telephone microphone. This provides the high acoustical gain in combination with the moderate directivity and associated background noise rejection desired.

Figure 2:
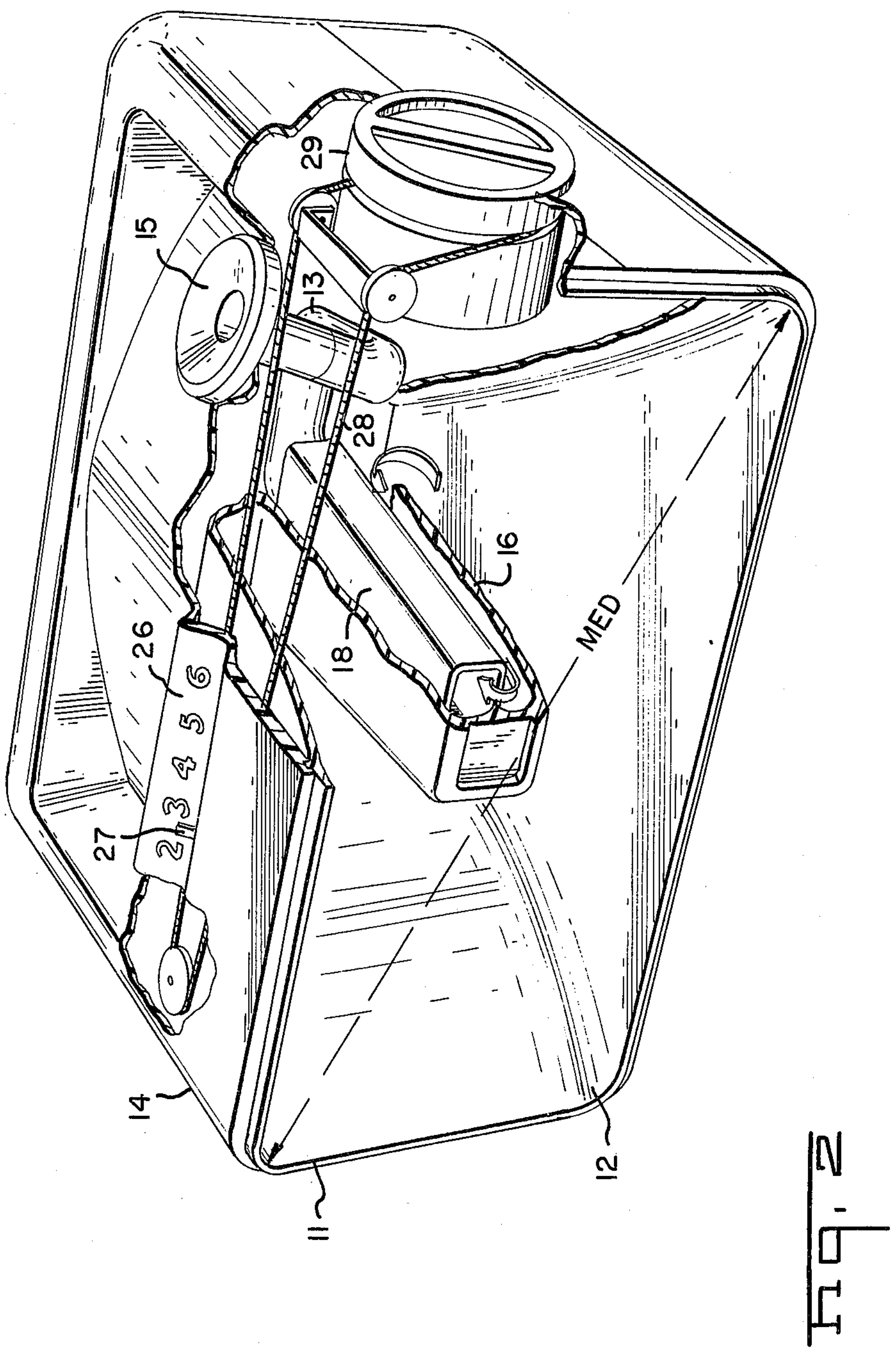
FIG. 2 is a partially broken away drawing of the preferred embodiment showing the exponential horn, means for coupling the tail of the horn to the telephone handset microphone, the timer display mechanism and the timer motor.
Figure 7:
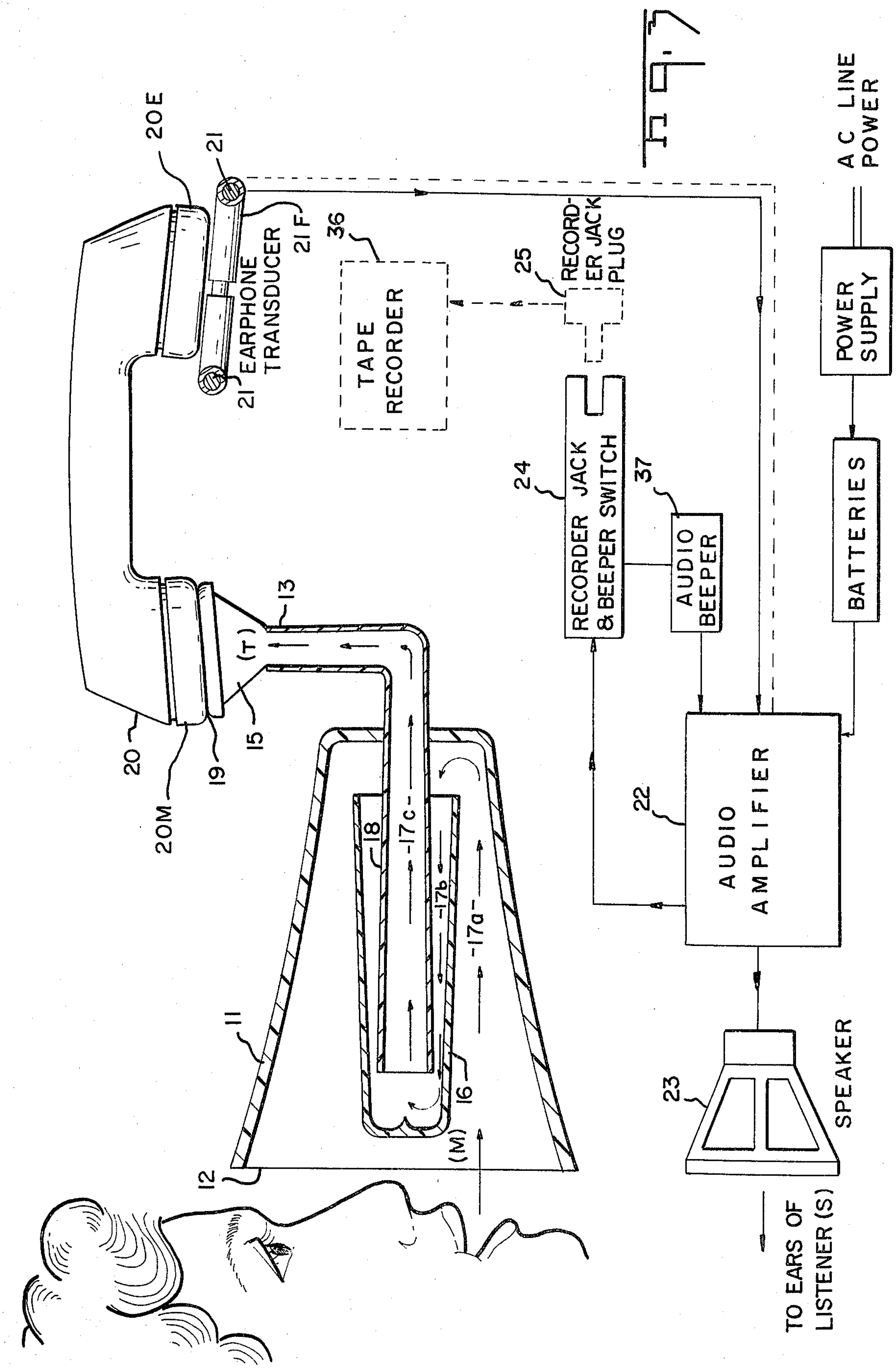

The exponential type horn 11 has an axial acoustical length (as shown by the arrows from (M) to (T) in FIG. 3) several times the maximum mouth entrance dimension (MED) (FIG. 2). This permits the gradually decreasing cross-section described above and provides for greater horn efficiency and relatively low added acoustical distortion. With low ratios of axial-acoustical-length/MED, the steep horn inside surfaces create reflection disturbances which impair speech recognition and intelligibility.

The housing 14 within which the horn is mounted has an open side. The mouth 12 of the horn is substantially coextensive with this open side of the housing, thus providing a maximum mouth area for this given size housing. The housing may have an area on its top surface designed to receive the telephone handset. When the handset 20 is in place on this area, acoustic coupling between the tail 13 of the horn and the handset microphone 20M is provided by coupling chamber 15 and seal 19. Sound entering the horn at 12 is conducted through the horn by an overall acoustic passageway consisting of three sound passages, an entrant passage 17*a*, and two re-entrant passages 17*b* and 17*c*. Passage 17*a* extends from mouth 12 rearwardly and is defined by the outermost horn wall and tubular wall 16. Passage 17*b* extends from the rear portion of the horn forwardly and is defined by tubular walls 16 and 18. Passage 17*c* extends from the front portion of the horn rearwardly and is within tubular portion 18. It continues upwardly to tail 13 and thence to coupling 15 which extends through the opening in the top surface at the rear of the housing 14.

Horn 11, walls 16 and tubular portion 18 define an odd number of sound passages (in this case three) extending from the mouth 12 to the tail 13 of the horn and thence to coupling chamber 15 and seal 19. The shape of seal 19 is mated, or complementary, to the shape of the microphone housing 20M of the telephone handset. A tight acoustic coupling is established between the telephone microphone 20M and the seal 19 by the weight of the telephone handset.

The telephone adapter contains an earphone transducer, in this case, an induction coil 21 disposed beneath the housing surface. Coil 21 preferably is electrostatically shielded by a Faraday Shield 21F and its connecting leads also are preferably shielded to minimize pickup by coil 21 or its leads of unwanted electrostatic hum and noise from electrical appliances and other hum and noise sources particularly those carried via local electric power wiring. The telephone handset earphone 20E is inductively coupled to the coil 21 which produces an electrical signal corresponding to the received communication. This electrical signal is amplified by amplifier 22 and and applied to speaker 23, which converts the amplified signal into audible sound. Speaker 23 is positioned so that during normal telephone conversation a minimum portion of the sound from the speaker is coupled back into the horn mouth 12, thus minimizing undesirable regenerative feedback (howl), while permitting high sensitivity of the horn to desired sounds.

An auxilliary output of the audio amplifier 22 is provided at recorder jack 24 to permit recording of conversations on a tape recorder 36 (not part of the telephone adapter) when recorder jack plug 25 is plugged into jack 24. When jack plug 25 is in place in jack 24, the switch in jack 24 can actuate an audio beeper 37 which injects a periodic beep in the telephone conversation indicating it is being recorded.

Power for operating the audio amplifier and audio beeper can be provided from batteries ("battery" model), from the AC power line ("line" model) or from both ("combination" model). The AC power supply can also be used to recharge the batteries when batteries are of the rechargeable type.

Another feature of this invention is a timer which prominently displays the elapsed time of a telephone call. The elapsed time display means preferably consists of a dial 26 which is traversed by indicator or pointer means 27 attached to an endless belt 28 that is moved by a timer motor 29. Alternatively, the elapsed time display may consist of a dial and an indicator, one of which is stationary and the other of which is mounted directly on the knob or other moving part of timer motor 29. Timer motor 29 drives the endless belt. In all models, the timer motor 29 can be of the mechanical spring type or the DC electrical type, the former being often preferred, particularly for the "battery" model, since it consumes no power from the batteries, resulting in longer battery life. For the "line" model, an AC synchronous type timer motor can be used.

When the mechanical spring type timer motor is used, this is wound at the beginning of the telephone call, such winding automatically returning the time display to zero. As the telephone call progresses the timing motor quietly actuates the dial or the indicator of the time display to show the correct elapsed time.

When using the DC electrical type or the AC synchronous type timer motors, return of the time indicator to zero and start of the motor can be instigated either by turning the knob 29 or by pushing a simple push-button (not shown) if the timer is of the electrical reset type.

An important requirement of any type timing motor used in the telephone communication set is that it has an acoustic level sufficiently low that the sound is not annoyingly transmitted by the sensitive telephone adapter and that the sound does not produce acoustical annoyance to an adapter user. Conventional mechanical timing motors with reasonable accuracy have been found to have excessive noise and require modifications which will reduce this noise to a suitable lower level.

AC synchronous type timing motors have an external alternating electromagnetic field which induces, via the earphone transducer, annoying "hum" in the speaker. This can be removed by placing a magnetic shield (e.g., mu-metal) between the timing motor and the earphone transducer.

As is evident from the detailed description of the horn, an even number of re-entrant sound passages positions the tail of the horn away from the mouth. This minimizes reduction in effective mouth area and also readily permits coupling of the tail to the handset microphone at positions at which the handset does not acoustically obscure the horn mouth and at positions permitting convenient acoustical connect/disconnect of the handset.

As used herein "exponential" type horn refers to a horn which can have a true exponential shape, in which the cross-sectional area changes exponentially or logarithmically with length, or can have other shapes which only approximate the true exponential shape.

In a preferred embodiment, the exponential horn mouth 12 has an effective acoustical area of at least 15 square inches, the horn having an axial acoustical length of at least 1.3 times the maximum mouth entrance dimension.

While a horn with an approximately rectangular mouth is shown in the drawing, the mouth may be circular, or multi-sided with straight and/or curved sides.

While a particular embodiment of the invention has been shown and described, various modifications are within the true spirit and scope of the invention. The appended claims are, therefore, intended to cover any such modifications in combination with others.

What is claimed is:

1. An adapter for a telephone permitting its hands-free use, comprising:

an exponential re-entrant horn having walls forming sound passages, said horn decreasing in acoustical cross-section from its mouth towards its tail portion;

a coupling end connecting with said tail portion to provide acoustic coupling with the telephone microphone;

a housing within which said horn is mounted, said mouth of said horn opening through a first part of said housing, and said coupling end opening through a second part of said housing substantially removed from said first part and outside the perimeter of said horn mouth, the area of said mouth being larger than the area of said coupling end, producing acoustic amplification between said mouth and said coupling end; and means for making audible communications received by the telephone earphone including speaker means external of said housing.

2. The adapter recited in claim 1 wherein said housing has an open side substantially coextensive with said mouth of said horn.

3. The adapter recited in claim 1 wherein said walls of said horn define an even number of re-entrant sound passages.

4. The adapter recited in claim 1 further comprising a display which indicates the elapsed time of a telephone call.

5. The adapter of claim 4 wherein said display comprises:

an elongated dial adjacent said housing;

a timing means which can be actuated at the beginning of a telephone conversation; and pointer means responsive to said timing means which indicates the elapsed time of the telephone conversation.

6. The adapter recited in claim 5 wherein said timing means is a mechanical spring actuated timer which generates sound of less than a predetermined level thereby not being annoying to a user of the adapter nor being annoyingly transmitted over the telephone via the adapter.

7. The adapter recited in claim 5 wherein said timing means is a timer of the AC synchronous motor type.

8. The adapter recited in claim 7 including a magnetic shield placed between said motor and an earphone transducer to reduce unwanted "hum" to a predetermined suitable low level.

9. The adapter recited in claim 1 in which said means for making audible communications received by the telephone earphone includes:

an earphone transducer which, via electromagnetic coupling with the telephone earphone generates an electrical audio signal corresponding to the received communication;

an audio amplifier, said audio signal being amplified in said audio amplifier; and a speaker connected to the output of said audio amplifier to generate an amplified sound corresponding to that generated by the telephone earphone.

10. The adapter recited in claim 9 further comprising:

a recorder jack to which said audio signal is connected, said jack output audio signal being suitable for connection to a conventional magnetic tape recorder;

a beeper switch at the recorder jack which actuates the beeper when a jack plug is placed in the jack; and an audio beeper which when actuated induces periodic "beeps" into the audio amplifier of predetermined intensity sufficient to be clearly heard by all participants of the telephone conversation being conveyed by the adapter, said audio beeper when desired, being activated by closure of said beeper switch.

11. The adapter recited in claim 1 wherein the exponential re-entrant horn has a mouth with an acoustical area of at least 15 square inches, and has an axial acoustical length at least 1.3 times its maximum mouth entrance dimensions.

12. The adapter recited in claim 1 wherein said mouth of said horn opens through a substantially vertical plane of said housing.

13. An adapter for a telephone permitting its hands-free use, comprising:

an exponential type horn having walls forming an even number of re-entrant sound passages, said horn decreasing in acoustical cross-section from its mouth towards its tail portion;

structure including a coupling end to provide acoustic coupling with the telephone microphone, the area of said mouth being larger than the area of said coupling end, producing acoustic amplification between said mouth and said coupling end;

a housing within which said horn is mounted, said coupling end opening through a part of said housing removed and outside the perimeter of said horn mouth; and means for making audible communications received by the telephone earphone including speaker means external of said housing.

14. The adapter recited in claim 13 wherein said housing has an open side substantially coextensive with said mouth of said horn.

15. The adapter recited in claim 13 further comprising a display which indicates the elapsed time of a telephone call.

* * * * *